May 26, 1931.  M. H. BRADEN  1,807,376
LIQUID FUEL BURNING SYSTEM
Filed March 9, 1925    8 Sheets-Sheet 3
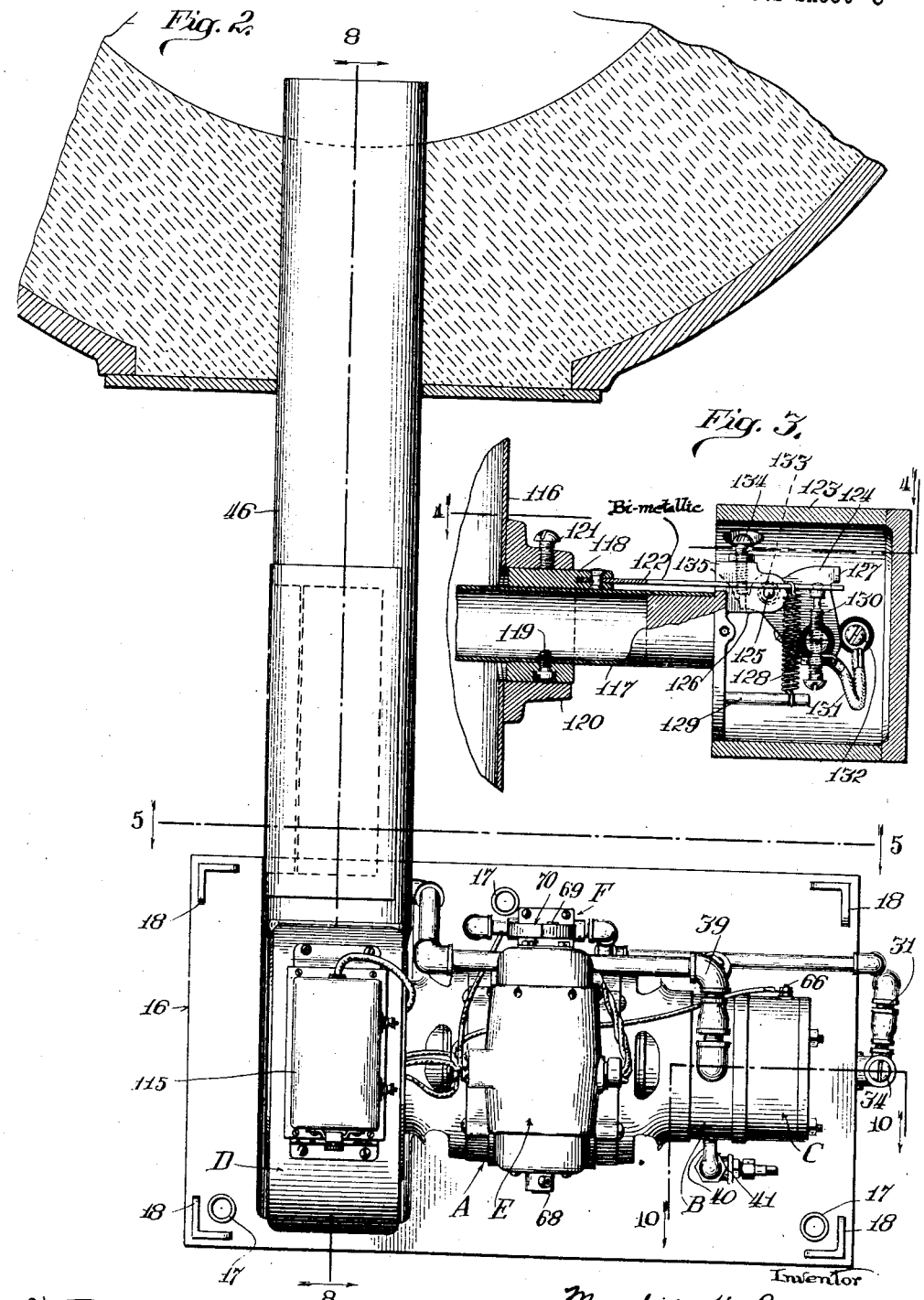

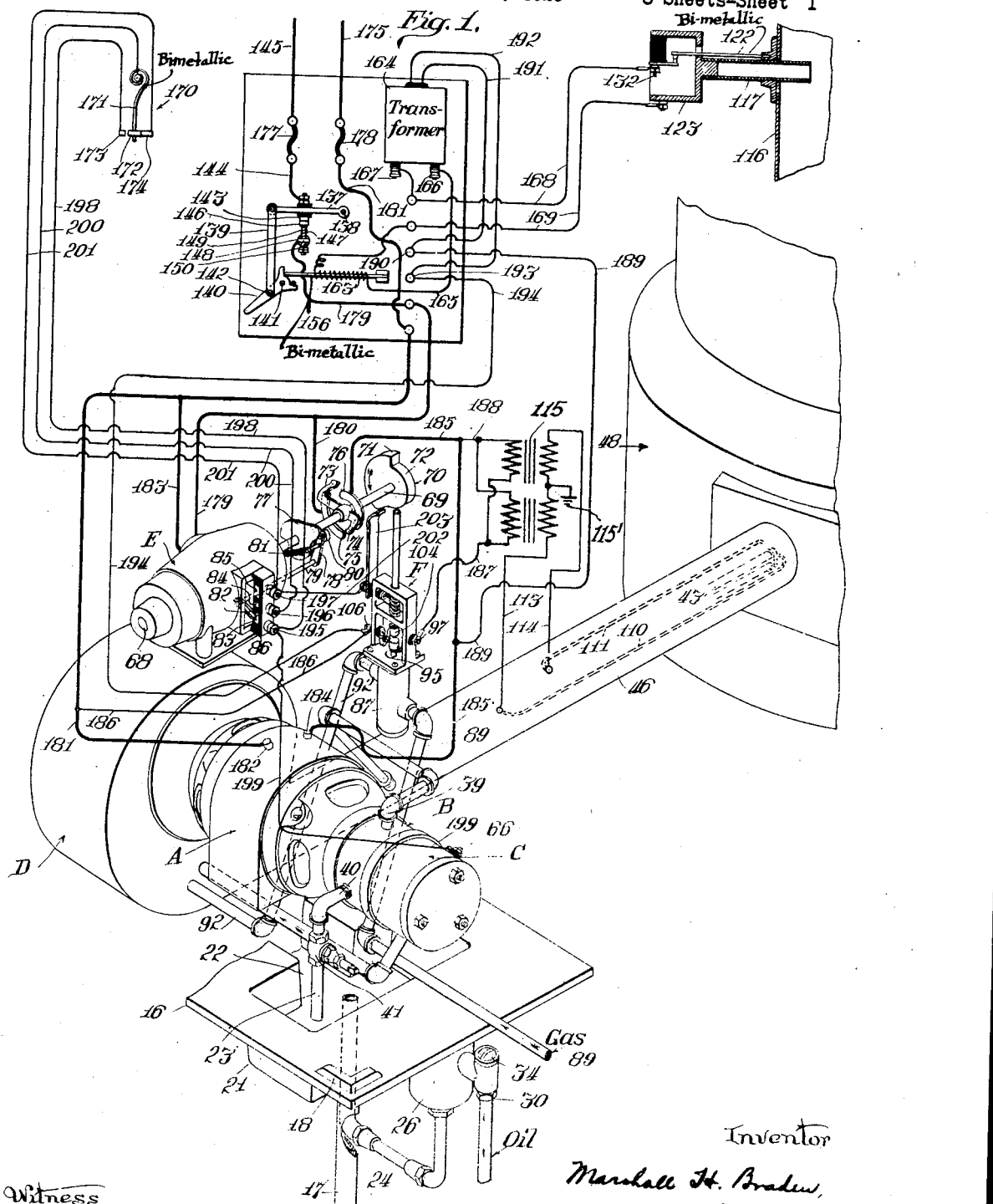

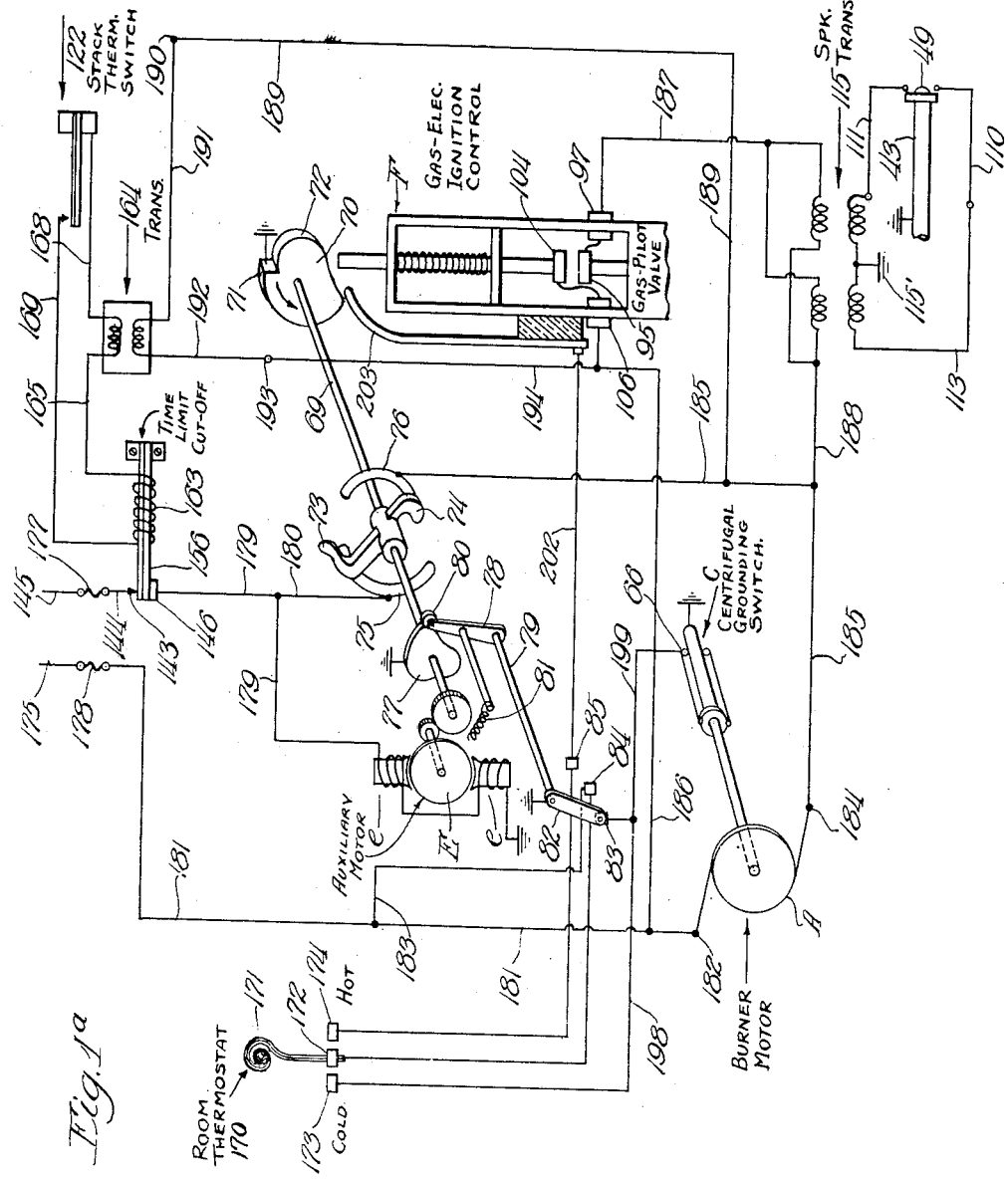

May 26, 1931.    M. H. BRADEN    1,807,376
LIQUID FUEL BURNING SYSTEM
Filed March 9, 1925    8 Sheets-Sheet 4

Inventor
Marshall H. Braden,
John L. Jackson.
Attorney.

Witness
Milton Lenoir

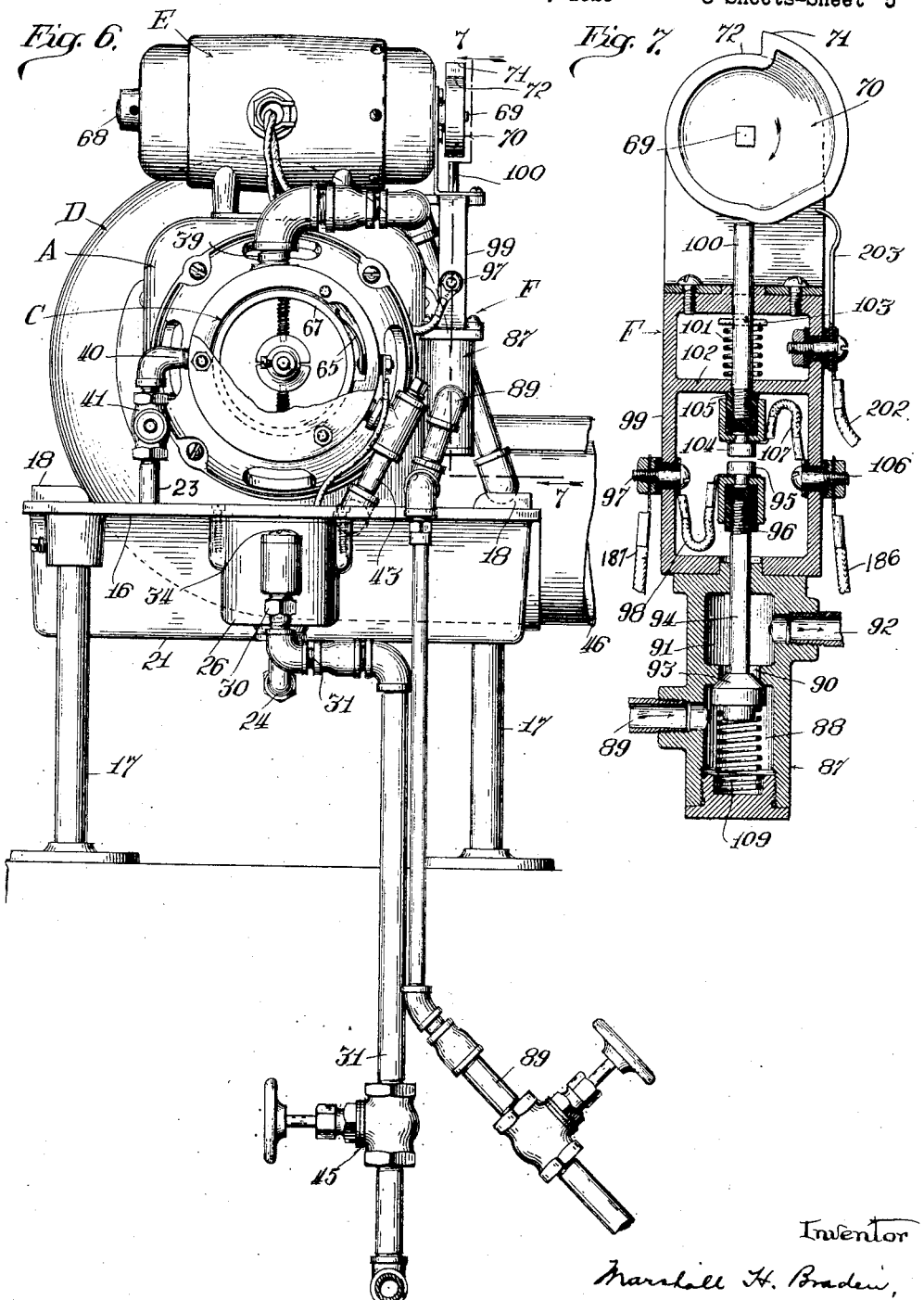

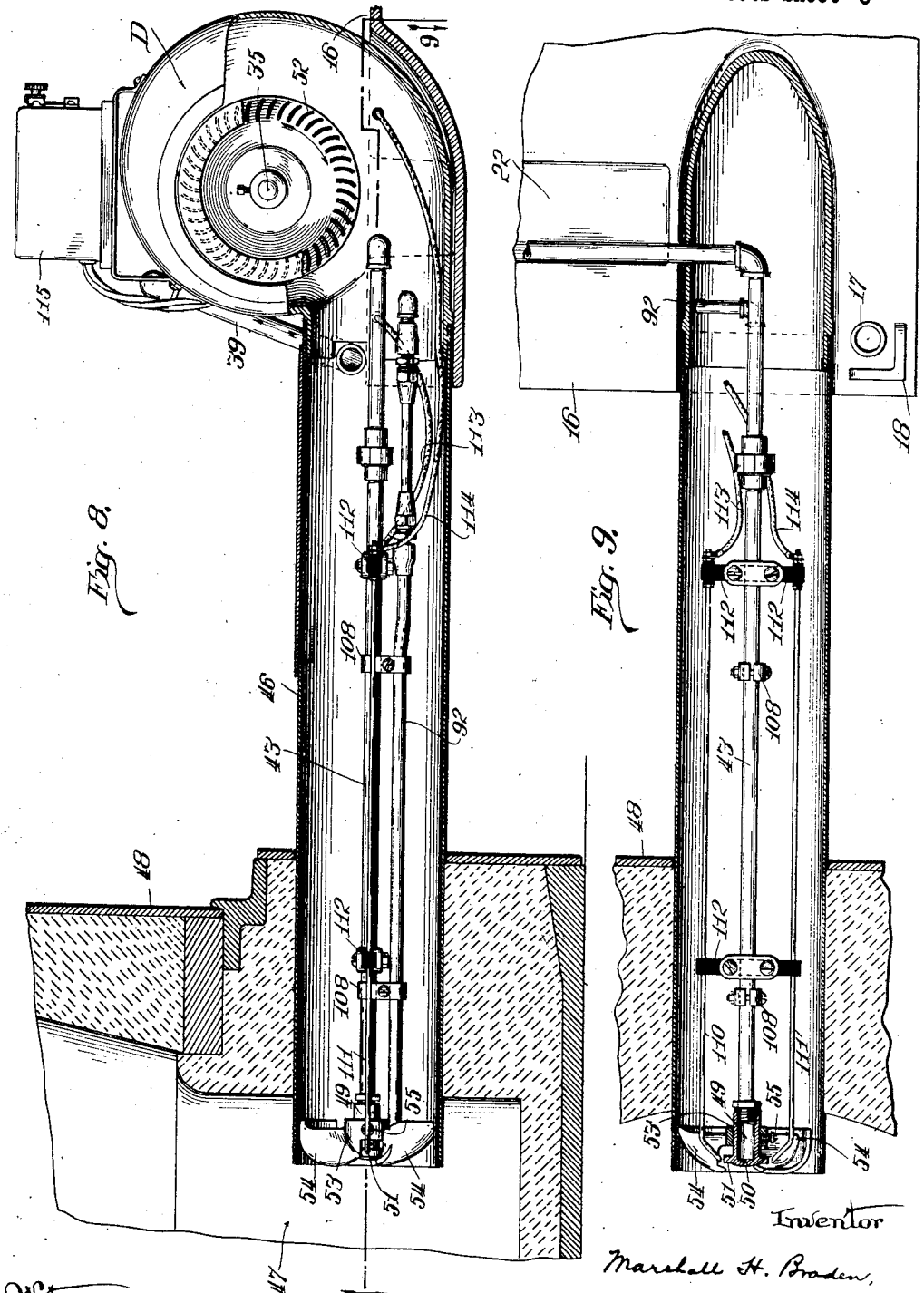

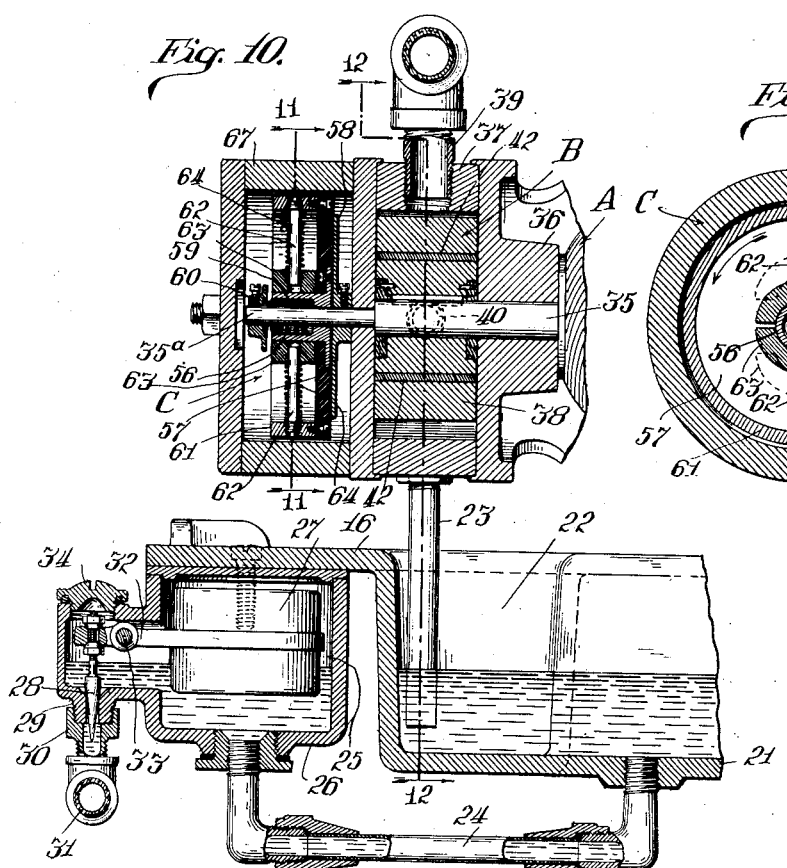
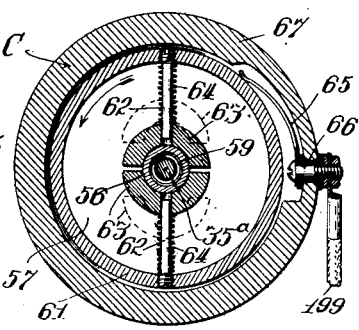
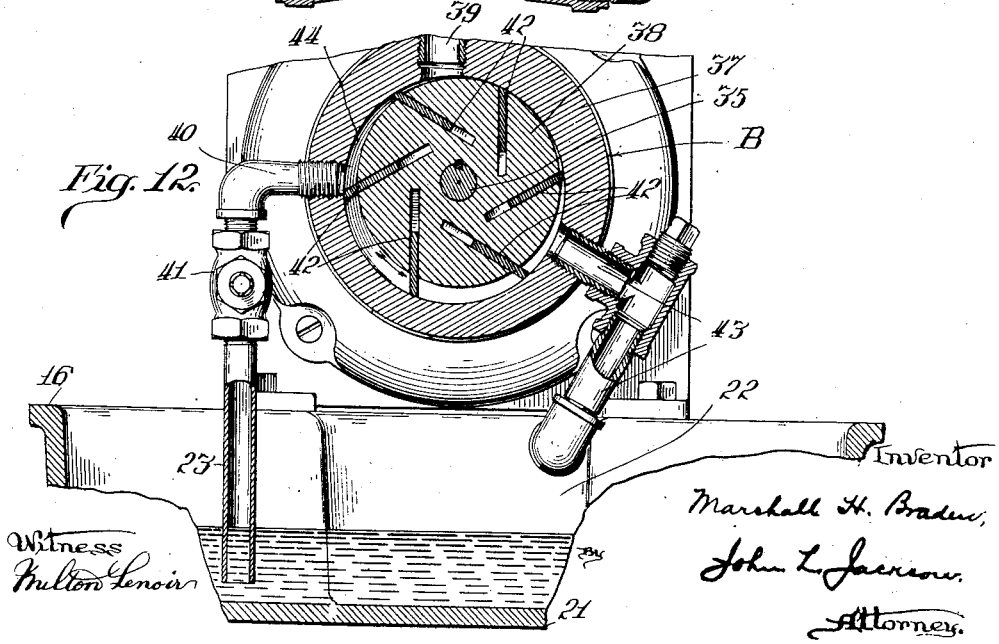

May 26, 1931.  M. H. BRADEN  1,807,376
LIQUID FUEL BURNING SYSTEM
Filed March 9, 1925   8 Sheets-Sheet 8
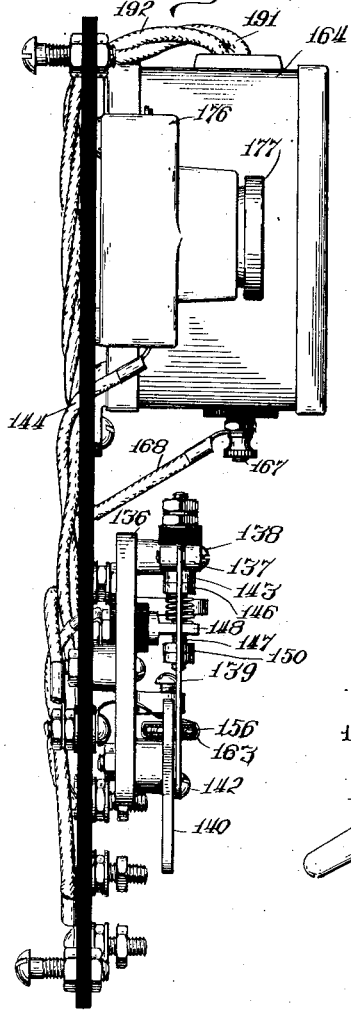
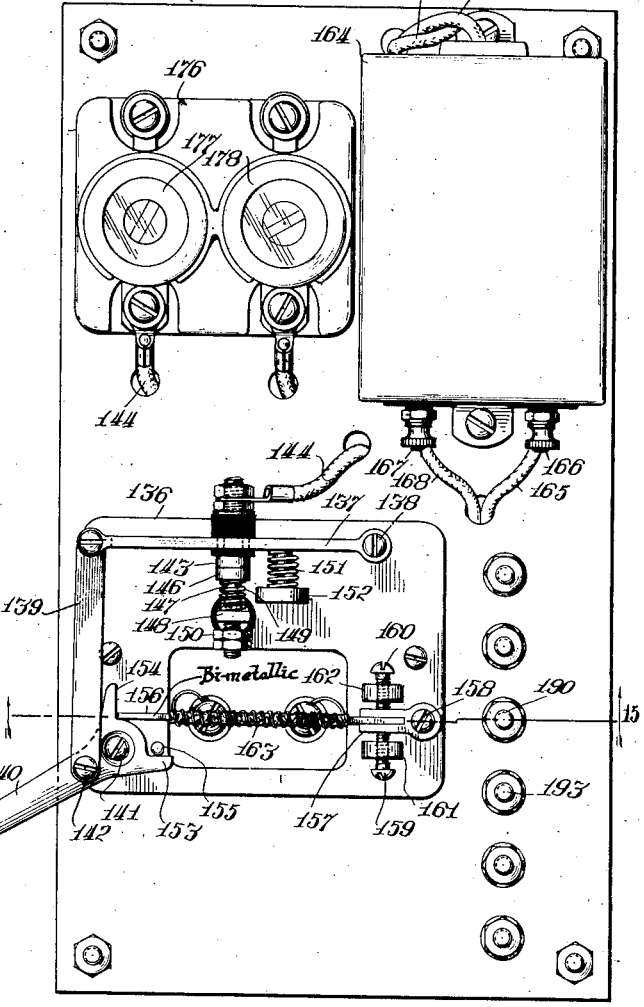
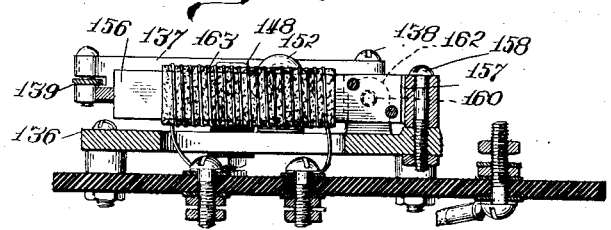
Inventor
Marshall H. Braden,
By John L. Jackson.
Attorney.
Witness
Milton Lenoir Patented May 26, 1931

1,807,376

UNITED STATES PATENT OFFICE

MARSHALL H. BRADEN, OF ROCK ISLAND, ILLINOIS, ASSIGNOR TO THE NU-WAY CORPORATION, OF ROCK ISLAND, ILLINOIS, A CORPORATION OF ILLINOIS

LIQUID FUEL BURNING SYSTEM

Application filed March 9, 1925. Serial No. 14,151.

My invention relates to the burning of liquid fuel, particularly for heating houses and other buildings, either by the use of hot air, or by means of steam or hot water heated by the combustion of the liquid fuel. In recent years a large number of devices have been developed and put on the market for burning liquid fuel in ordinary hot air furnaces as a substitute for coal burning, and while many of such devices have gone into use with a greater or less degree of success, so far as I am aware none of the systems heretofore proposed have been entirely satisfactory because they have not met the exacting conditions surrounding the use of liquid fuel, particularly in private homes. To meet the requirements of residential use a heating system which operates by the combustion of liquid fuel must be such that it requires practically no attention on the part of the householder, and, therefore, it must be substantially completely automatic in all its operations,—that is to say, the fuel must be supplied automatically when required without danger of an over supply when it is not needed, which might cause damage and waste because of its overflowing; the fuel must be properly mixed with air and supplied to the burner in such manner as to secure perfect combustion, so that the highest possible degree of heat may be obtained from the combustion of a minimum quantity of fuel without the production of soot; the apparatus must be arranged to start combustion when the temperature of the house falls to a predetermined point and stop it when the house has been warmed to the desired predetermined degree, and these operations must be performed automatically day or night. In addition to these fundamental requirements, it is desirable that the apparatus be compact, and of such character that it may readily be installed in existing furnaces, or heaters of other descriptions; that it be electrically controlled and operated, and that suitable safety provisions be made so that loss or damage will not ensue should the proper operation of the apparatus be accidentally interfered with. For example, when the fuel supplying mechanism is in operation if the fuel should fail to ignite, or the flame should be extinguished, it is important that the supply of fuel be cut off until the igniting apparatus can again be caused to function, as otherwise there would be a considerable loss of fuel and the house would not be heated. To guard against such a contingency it is necessary to provide means for automatically stopping the fuel supplying mechanism whenever combustion accidentally ceases. Also, as is well known, the supply of electric current occasionally fails because of storms, or a breakdown at the generating plant, and where the heating system is controlled and operated by electric current from such a source of supply the failure of the supply of current would, of course, prevent the operation of the heating system, and it is necessary to so design the apparatus that any such cessation of current supply will not interfere with the proper operation of the heating system when the current supply is restored. Other desiderata in liquid fuel burning systems are that the admission of the combustible mixture to the combustion chamber and its ignition be motor controlled so that proper timing can be obtained and the fuel may be admitted gradually instead of suddenly, as where the fuel is admitted suddenly it ignites with an explosion which is apt to blow the furnace door open, and besides it is objectionably noisy; that the use of mechanically operated valves to control the supply of liquid fuel be avoided; that the motor be self-cooling; and that the escape of objectionable odors to the residential portion of the house be prevented.

To provide a liquid fuel burning system possessing all these desirable qualities, and various other advantages which will be hereinafter particularly pointed out, is the object of my present invention, which object I accomplish by the means illustrated in the accompanying drawings and hereinafter described. I wish it to be understood, however, that my invention is not limited to embodiment in the specific manner illustrated as such apparatus may be modified in various ways without departing from my invention as defined in the claims appended hereto since many of the features of my said invention are generic in character, and therefore, the claims therefor are intended to cover such variations or modifications as will occur to those skilled in the art.

Referring now to the accompanying drawings which illustrate the apparatus which I prefer to use in practicing my invention, Fig. 1 is a view, mainly diagrammatic, showing the general plan and arrangement of my improved liquid-fuel burning system, including the electric wiring by which the current from a central source is supplied to the apparatus and utilized in its control;

Figure 1a is a fragmentary schematic diagram illustrating in greater detail the control circuit of the auxiliary motor;

Fig. 2 is a plan view of the main unit of the apparatus by which the fuel is supplied to the furnace and its combustion controlled, applied to an ordinary hot air furnace, a portion of the wall of which is shown in section;

Fig. 3 is a vertical sectional view on line 3—3 of Fig. 4, illustrating a safety device employed in connection with the chimney or smokestack for stopping the operation of the means for supplying fuel to the combustion chamber should ignition fail to take place or combustion accidentally cease;

Fig. 6 is an end view of such main unit, some parts being broken away;

Fig. 7 is a detail, being a vertical section on line 7—7 of Fig. 6 illustrating a part of the ignition controlling devices, and including a valve by the opening of which artificial gas is admitted to the combustion chamber for ignition purposes;

Fig. 8 is a longitudinal vertical section on lines 8—8 of Fig. 2, illustrating the means for supplying fuel to the combustion chamber, and the ignition devices associated therewith;

Fig. 9 is a horizontal section on line 9—9 of Fig. 8;

Fig. 10 is a partial longitudinal vertical section on line 10—10 of Fig. 2 illustrating the pump by which air and fuel oil are mixed and delivered to the combustion chamber, and the means for supplying fuel oil to the pump; also a centrifugally operating electric switch, the purpose of which will be hereinafter described;

Fig. 11 is a vertical cross-section on line 11—11 of Fig. 10 illustrating the construction of such switch;

Fig. 12 is a vertical cross-section on line 12—12 of Fig. 10, illustrating the pump, and its connections;

Fig. 13 is a front elevation of a panel which carries some of the electrical apparatus;

Fig. 14 is a side view of the parts shown in Fig. 13; and

Fig. 15 is a horizontal section on line 15—15 of Fig. 13, illustrating the construction of a thermostatically operated circuit breaker the operation of which is controlled by the safety devices associated with the stack, shown in Figs. 3 and 4.

Figure 5:
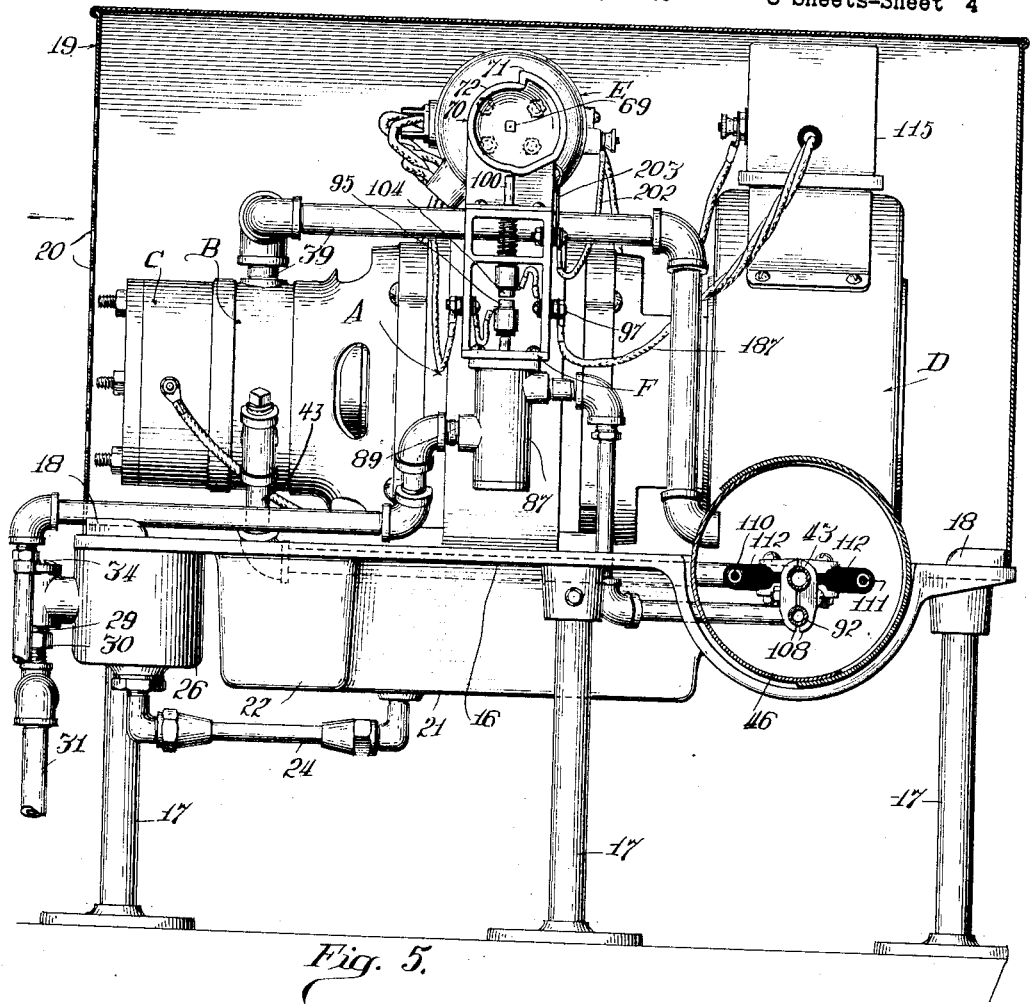
Fig. 5 is a vertical section on line 5—5 of Fig. 2, showing in side elevation the main unit of the apparatus, enclosed in a suitable hood or housing which is omitted from the illustration of Fig. 2.
Figure 4:
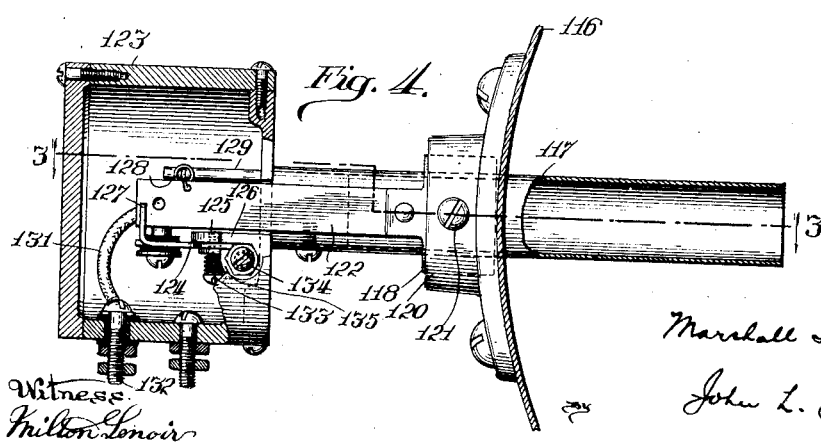
Fig. 4 is a horizontal section substantially on line 4—4 of Fig. 3.

Coming now to a description of the several parts of my improved system in the form illustrated in the drawings, it will be well first to state briefly that it comprises a main electric motor which drives a rotary pump and also a fan, both of which are directly connected with the armature shaft of the motor. The pump operates to draw liquid fuel, preferably an inexpensive grade of fuel oil, from a sump in which a supply of liquid fuel is maintained at a predetermined level by means of a float controlled valve placed in a feed pipe leading from any suitable source of supply, as from a tank from which the fuel flows by gravity to the float controlled valve chamber. The pump also draws in air which is associated in the pump with the fuel oil, the mixture being discharged under pressure by the pump through a pipe leading to the combustion chamber of the furnace or other heater where it is to be consumed. This pipe extends through a larger duct or flue which leads from the outlet of the fan to the combustion chamber, where the air delivered through it aids in the combustion of the fuel mixture delivered by the pump. Also mounted on the armature shaft of the main motor and rotated thereby is a centrifugal switch, the purpose of which will be hereinafter described.

In addition to the main motor, I employ an auxiliary electric motor which is also an electric switch, this auxiliary motor being preferably attached to and forming a part of the unit comprising the main motor, pump, fan, and centrifugal switch, and associated with said auxiliary motor are the ignition controlling devices, including an electric switch which controls the ignition sparking devices, and a valve which controls the admission to the combustion chamber of artificial gas which is used for starting combustion. These parts are all assembled in the form of a unit which is mounted on a suitable base and is enclosed by a hood or housing having slits or openings at the end farthest from the fan, so that the air drawn into the fan flows into and along the hood over the main motor and parts operated by it, and consequently such parts are cooled, and at the same time any odors from the fuel oil are carried into the furnace instead of escaping into the basement or other apartment in which the apparatus is installed. The auxiliary motor above referred to controls the starting and stopping of the main motor, and also the operation of the ignition devices, and, as will hereinafter appear, it is arranged to operate only when its services are required, that is to say, when the temperature of the house drops to a point where heat is needed the auxiliary motor starts and operates for a few seconds to effect the starting of the main motor and the operation of the ignition devices, after which it stops while the main motor continues to operate. When the house has been heated to the required temperature the auxiliary motor again starts and operates for a few seconds to effect the stoppage of the main motor and the resetting of the parts of the apparatus so that they will be in condition for a repetition of the operating cycle. The operation of the auxiliary motor for stopping the main motor does not actuate the ignition devices, as, of course, there is no occasion for their functioning at that time. The starting of the auxiliary motor is controlled by a thermostat of any suitable description located in one of the rooms of the house, and it is arranged to start the auxiliary motor when the temperature of such room falls to a predetermined point, and also when it rises to a point where the heat should be shut off. To stop the operation of the main motor by which fuel is supplied to the combustion chamber in the event that ignition should fail to take place or combustion should accidentally cease, a thermostatic switch is associated with the stack in such manner that it will be heated by the waste gases discharged therethrough, which switch when so heated maintains an open circuit through a thermostatically controlled circuit breaker in the main current supply circuit. When on the other hand the main motor is in operation and said switch is not heated, it is arranged to close an auxiliary circuit which heats the thermostatically controlled element of the circuit breaker and causes the actuation of such circuit breaker to break the main current supply circuit and stop the main motor, thereby cutting off the supply of fuel to the combustion chamber. The circuit breaker must be manually reset before the heating apparatus can again be started, this manual resetting being required for the purpose of insuring inspection by someone whenever the safety switch in the stack functions to break the main circuit, as in that case it would be evident that something is wrong and requires attention.

From the foregoing brief description of the principal parts of my improved apparatus an idea of the general arrangement and operation of the system may be had, and I shall now proceed to a more detailed description thereof as illustrated in the drawings.

Referring first to Figs. 1, 2 and 5, A indicates the main motor, B the pump, C the centrifugal switch, and D the fan, all of which are axially alined and are securely connected together so as to form a unitary assembly which is mounted on a base 16 supported by standards 17 placed at convenient points. The base 16 is preferably rectangular in shape, as shown in Fig. 2, and at its four corners is provided with upwardly-extending angle flanges or brackets 18 which provide means for positioning and securing in place a hood or housing 19 which encloses such assembly and also some other parts attached thereto. Such other parts principally comprise the auxiliary motor E and the ignition unit F. As best shown in Fig. 5, at its end farthest removed from the fan D the hood 19 is provided with a series of slits or openings 20 through which air is drawn into the hood by the operation of the fan, and consequently when the fan is in operation there is a continuous flow of air longitudinally of the hood and around the operating parts therein which serves to keep such parts cool and also to carry any noxious odors into the fan and thence into the combustion chamber. The hood is, of course, secured in place so as to be readily removable to permit access to the operating parts as occasion may require. Forming a part of the base 16 is a casing 21 which extends downwardly and forms a well or sump 22 adapted to contain liquid fuel for supplying the pump B, which, as shown in Fig. 1, overlies such sump and is adapted to take fuel therefrom through a suction pipe 23 which extends down a sufficient distance below the level of the liquid therein. Oil or other suitable fluid is supplied to the sump 22 through a pipe 24 which communicates with the bottom thereof and also with the bottom of a float chamber 25 provided by a casing 26 which is secured to the under side of the base 16, as best shown in Figs. 5 and 10. Located in the float chamber 25 is a float 27 which operates a float valve 28 of any suitable description, preferably a needle valve, adapted to be seated in the passage through a nipple 29 which is connected by a coupling 30 and pipe 31 with a supply tank arranged to feed oil to the float chamber whenever the valve 28 is opened by the lowering of the level of the liquid therein. The float 27 is connected with the valve 28 by a rocking arm 32 pivotally supported at 33, as shown in Fig. 10. A removable cap 34 located over the needle valve 28 permits access thereto for adjustment purposes.

As shown in Figs. 10 and 12, 35 indicates the armature shaft of the main motor A, and on this shaft, adjacent to one of the bearings 36 thereof, is mounted the pump B. This pump comprises a stationary cylindrical shell 37 in which is eccentrically mounted a rotor 38 which is keyed to the armature shaft 35 so that it rotates therewith. The rotor is cylindrical in form and it is so disposed with relation to the bore of the shell 37 that it contacts peripherally therewith along a longitudinal line, which in the illustrated arrangement is a little to one side of the longitudinal vertical plane of the armature shaft. The rotor 38 is designed to rotate in a counterclockwise direction as viewed in Fig. 12, as indicated by the arrow in said figure, and communicating with the bore of the pump adjacent to and at the left of the line of contact between the rotor and the shell is an air inlet pipe 39 through which air is admitted to the bore or cylinder of the pump. About ninety degrees from the pipe 39 an oil supply pipe 40 also communicates with the cylinder of the pump, as shown in Fig. 12, said pipe being connected by a cock 41 with the pipe 23 leading to the sump 22, so that the pipe 40 supplies oil to the pump. The rotor 38 is provided with a number of vanes 42 fitted in tangentially disposed slots therein so that they may be projected by centrifugal force beyond the periphery of the rotor into engagement with the wall of the pump cylinder. Preferably six of these vanes are provided, spaced apart at equal distances, as shown in Fig. 12. Communicating with the cylinder of the pump at a point about one hundred and thirty-five degrees from the position of the pipes 39 and 40 is an outlet pipe 43 through which the air and oil admitted to the pump cylinder are forced by the action of the rotor, for delivery to the combustion chamber, as hereinafter described. Rotary pumps of this general type are very old in the art, but it will be noted that by the rotation of the rotor, as each one of the vanes passes the air inlet 39, air is drawn in behind it and expands in the space or compartment between such vane and the next succeeding vane, so that when such compartment, as for example that indicated by 44 in Fig. 12, reaches the oil inlet 40 the oil is drawn in to such compartment and admixed with the air therein, the mixture being further expanded and afterwards reduced in volume as the rotor rotates, until when such compartment reaches the discharge pipe 43 the mixture is forced out of the pump through said discharge pipe. In this way a very good mixture is obtained, which when supplied with secondary air from the fan D burns with a blue flame, giving practically perfect combustion and a much higher degree of heat than can be obtained with any other apparatus of which I am aware. In fact I have found by experiment that I am able to obtain approximately six hundred degrees more heat than can be obtained by burning the same amount of fuel by the use of the best oil burning systems of this type at present on the market. By taking the fuel oil from a sump as described, oil is supplied to the pump only when the pump is in operation, since the feed to the pump is dependent on such operation. Consequently, there is no danger of flooding, which not only wastes oil, but also is a considerable fire hazard, to say nothing of the uncleanliness and discomfort caused by the escape of oil from the apparatus. For convenience in shutting off the supply of oil through the pipe 31 when desired, said pipe is preferably provided with a valve 45 at some convenient point between the float chamber and the main oil supply tank, as shown in Fig. 6.

The pipe 43 leading from the pump extends longitudinally through an air tube or duct 46 through which the fan D discharges into the combustion chamber 47 of the furnace or other heater 48, as shown in Figs. 5 and 8, said pipe being preferably located axially with reference to said duct so that the air stream extends uniformly around it. At its discharge end, which lies just within the discharge end of the duct 46, as shown in Fig. 9, the pipe 43 is provided with a nozzle 49 having a minute orifice 50 through which the mixture of air and oil contained in the pipe 43 is discharged into the combustion chamber, and adjacent to such orifice said nozzle is provided with a radially-disposed annular flange 51 which cooperates with electric terminals hereinafter described in igniting the fuel.

The air pipe 39 which supplies air to the pump B is connected with the air duct 46, preferably at a point near the fan, as shown in Fig. 8, so that the pressure caused by the fan forces a flow of air through said pipe to the pump, but if desired the pipe 39 may take air from the atmosphere, as the operation of the pump suffices to draw into it an adequate supply.

The rotor 52 of the fan D is best shown in Fig. 8, and it also is mounted on and rotates with the armature shaft 35 of the main motor A, the fan being located at the opposite side of said motor from the pump B, as shown in Fig. 2. Said rotor rotates in a clockwise direction, as indicated by the arrow in Fig. 8, and operates to force air through the duct 46 into the combustion chamber 47. Adjacent to the discharge end of said duct I provide a stationary deflector 53, preferably in the form of a hub having spiral blades 54, against which the air stream impinges, and by which it is given a whirling motion. The deflector 53 is secured in position by fitting it upon the nozzle 49, as shown in Fig. 9, where it is secured by a set screw 55 or in any other suitable way.

Mounted upon the armature shaft 35 adjacent to the pump B is the centrifugal switch heretofore referred to, which is best illustrated in Figs. 10 and 11. This switch comprises a hub 56 which is loosely mounted on the reduced extension 35$^a$ of the armature shaft 35 and is in electrical contact therewith. At its inner end said hub portion carries an insulated disc 57, preferably of fiber or similar material, adapted to furnish a friction surface, and mounted on and rotating with the armature shaft extension 35$^a$ is another disc 58 which is adapted to bear against and have frictional contact with the adjacent face of the disc 57. These two discs are yieldably held in contact with each other by a spring 59 mounted on the shaft member 35$^a$ in a recess in the hub 56 and bearing against a collar 60 mounted on and secured to the outer end of the shaft member 35$^a$. By this construction the discs 57, 58 constitute a friction clutch by which rotation of the armature shaft 35 operates to rotate the hub 56 and disc 57. The purpose of this arrangement is to start rotation of the hub 56 gently when the motor A is started, and allow it to come to speed gradually. Secured to the outer marginal portion of the disc 57 is a ring or band 61 that is an electrical conductor, and extending radially inwardly from said band at diametrically opposite points are two rods 62 which are firmly secured at their outer ends to said band, as shown in Figs. 10 and 11. Slidably mounted on said rods are two semi-cylindrical weights 63 made of conducting material, and adapted when in their normal or innermost position to bear upon and make electrical contact with the periphery of the hub 56, as shown in Fig. 11. Springs 64 mounted on said rods between the weights 63 and the band 61 serve to press said weights inwardly. A spring contact member 65 is connected to a binding post 66 carried by the housing 67 of the switch C and bears on the periphery of the band 61, as shown in Fig. 11. It will be noted that by the arrangement described the band 61 is always in electrical connection with the binding post 66 through the spring 65, and that when the weights 63 are in their normal or innermost position, shown in Fig. 11, the band 61 is in electrical connection with the hub 56 through the rods 62 and the weights 63. The hub 56 being in electrical connection with the armature shaft 35, or in other words grounded through said shaft, it will be apparent that when the motor is not in operation the switch will form a closed circuit between binding post 66 and the armature shaft 35. When, however, the motor is started, rotation of the armature shaft will cause the weights 63 to be thrown outward by centrifugal action, thereby breaking the electrical connection between the band 61 and the armature shaft, inasmuch as said band is insulated from said shaft by the disc 57, and its only electrical connection with the armature shaft is by means of the contact formed between the weights 63 and the hub 56. The function of this centrifugal switch will be hereinafter explained.

The auxiliary motor or motor switch E is preferably mounted upon the main motor A as a part of the unitary assembly, its armature shaft 68 being disposed at right angles to the armature shaft of the main motor, as shown in Figs. 1 and 2. Parallel with the armature shaft 68 is a slow speed shaft 69, which is connected with the armature shaft 68 by suitable speed reducing gearing enclosed within the housing of the auxiliary motor, and extends out of said housing at one end. Upon its outwardly extending end the shaft 69 carries a cam 70 of conducting material, the breast or operative portion 71 of which extends through an arc of about one hundred and sixty degrees. The depressed or valley portion 72 thereof is inoperative. This cam is adapted to be rotated in the direction indicated by the arrow in Fig. 1, but, by reason of the speed reducing gearing interposed between the armature shaft 68 and the shaft 69, it rotates at a much slower speed than that of said armature shaft. Also mounted on the shaft 69 are two spring contact brushes 73, 74 extending radially therefrom in opposite directions and of different lengths. Said brushes are adapted to make contact respectively with segmental contact plates 75, 76 located at different distances from the axis of the shaft 69 and securely held in position in any suitable way, as by securing them to a plate attached to the housing of the motor E. The arrangement of these parts is such that normally, that is, when the fuel burning apparatus is not operating, the brushes 73, 74 will be out of contact with their respective contacts 75, 76, and the main motor operating circuit, which, as hereinafter explained is controlled by these members, will be broken. When, thereafter, the auxiliary motor E is started, and the shaft 69 accordingly rotates in the direction indicated by the arrow in Fig. 1, as soon as said shaft begins to rotate the brush 73 moves into contact with the segment 75 and the brush 74 moves into contact with the segment 76, thereby closing the circuit through the main motor. The length of the segments 75, 76 is such that this contact is maintained while the shaft 69 rotates through half its cycle, at which time the brushes 73, 74 will be adjacent to the opposite ends of their respective segments. When the shaft 69 has rotated through half its cycle, as will be hereinafter explained, the auxiliary motor E stops, thereby leaving the circuit to the main motor closed. When the auxiliary motor E is again started following the operation just described, the brushes 73, 74 move out of contact with their respective segments, and the circuit through the main motor is then broken because the brush 73 is arranged to pass the segment 76 without making contact with it. In a like manner the brush 74 passes the segment 75 without making contact with it. The consequence is that during the second half of the cycle of rotation of the shaft 69 the circuit of the main motor remains open, and as the auxiliary motor E stops after the completion of this second half of the cycle it then stops with the main motor circuit still open. For convenience this second half of the cycle will be referred to as the resetting movement of the auxiliary motor, because its purpose is to reset the parts so that they will function properly when heat is again required. As shown in Fig. 1, the shaft 69 carries a second cam 77 which rotates therewith, and cooperates with an arm 78 mounted on a rock-shaft 79 suitably supported in the motor housing. Said arm is provided with an anti-friction roller 80 which bears on the periphery of said cam and is yieldingly held in engagement therewith by a spring 81. The rock-shaft 79 also carries a spring contact finger 82 which by the rocking of said rock-shaft is movable into engagement with either of three contact plates 83, 84, 85 mounted on an insulated block 86 supported on the housing of the auxiliary motor E, as shown in Fig. 1. The cam 77 has one high point and at its diametrically opposite side one low point, as clearly illustrated in Figures 1 and 1a. The shaft 69 and cam 77, in previously rotating into the angular position shown, has caused the high point of the cam 77 to swing the roller bearing arm 78 in an outward or clockwise direction, against the tension of the spring 81, and such clockwise oscillatory movement of the shaft 79 has caused the contact finger 82 to swing down into engagement with the lower contact 83. This represents the end of one cycle or one half cycle, at which time the auxiliary motor E has stopped. When this motor is again energized, through electrical connections which I shall later describe, the shaft 69 and cam 77 resume their relatively slow speed rotation in the same counter-clockwise direction (note arrow on cam 70) and during such movement the surface of the cam 77 tends to recede from the arm 78 but the spring 81 functions to hold said arm pressed up against said cam. The result is that the arm 78 is caused to oscillate inwardly in a counter-clockwise direction at the same time oscillating the shaft 79 and swinging the arm 82 in an upward direction. As the roller arm 78 rides over the gradually receding diameter of the cam 77, intermediate its high and low points, the contact arm 82 passes into engagement with the intermediate contact 84 and then continues beyond said contact until the roller arm 78 engages with the low point of the cam 77 at which time contact arm 82 has moved up into engagement with the upper contact 85. At this time the auxiliary motor E stops, this representing the completion of the other cycle or half cycle. When this motor is again energized the cam 77 again swings the arm 78 in an outward direction against the tension of the spring 81 and causes the contact arm 82 to swing downwardly over the middle contact 84 and finally into engagement with the bottom contact 83, at which time the high point of the cam is then under the roller arm, corresponding to the condition first described. It will be seen from the foregoing that the arrangement of these parts is such that during the first half rotation, or combustion starting movement, of the shaft 69, the finger 82, which initially bears on contact point 83, will be moved by the rocking of the shaft 79 under the action of the cam 77, from said contact point across contact point 84 to contact point 85. During the re-setting movement of the shaft 69 said finger is moved in the opposite direction until it comes to rest on contact point 83. Cam 70, shaft 69 and cam 77, being all electrically connected together by being mechanically connected, are all grounded to the auxiliary motor frame. Since the spring contact finger 82, the rock-shaft 79, the arm 78, and the anti-friction roller 80, which bears on the periphery of the grounded cam 77 and is yieldingly held in engagement therewith by spring 81, are all mechanically connected together and suitably supported in the auxiliary motor frame, it is apparent that the contact finger 82 also is always grounded to the auxiliary motor frame. It will be understood that by reason of the diagrammatic character of Fig. 1 the cam 77 and the switch parts comprising the brushes 73, 74 and segments 75, 76 are shown as comparatively widely separated from each other and lying outside of the housing of motor E, but in practice these parts are enclosed within the motor housing, and also the cam 70 is placed close to one end of said housing, as shown in Fig. 2. Fig. 1 serves to illustrate the relative position and the operation of these parts, and is not intended to be accurate as to immaterial details. Figure 1a serves to illustrate by a schematic fragmentary diagram in greater detail, the control circuit of the auxiliary motor, which will be hereinafter explained.

One of the functions of the cam 70 is to actuate the ignition devices, which will now be described. Referring to Fig. 7, 87 indicates a gas valve housing in which is an inlet chamber 88 which is adapted to receive some suitable readily ignitable gas, such as illuminating gas, through an inlet 89 having connection with any suitable source of supply. Communicating with the inlet chamber 88 through a port 90 is an outlet chamber 91 with which communicates a gas outlet pipe 92, and seated over said port is a plunger valve 93 having a stem 94 which extends up through a suitable bearing in the housing 87. At its upper end the stem 94 is provided with a contact point 95 which is insulated therefrom by insulating material 96. The contact point 95 is connected with a binding post 97 by a flexible conductor 98. The binding post 97 is mounted on a frame 99 which is fitted upon the housing 87 and secured thereto, as shown in Figs. 1, 5 and 7. Alined with the valve stem 94 is a plunger 100 supported to reciprocate in the frame 99 above said valve stem and normally pressed upward by a spring 101 mounted on said plunger between a crossbar 102, which forms a part of the frame 99, and a pin 103 secured to said plunger. At its lower end the plunger 100 carries a contact point 104 which is insulated therefrom by an insulator 105. The contact point 104 is connected with a binding post 106 by a flexible conductor 107. The arrangement is such that the contact point 104 is normally out of contact with the contact point 105 but may be moved into contact therewith by moving the plunger 100 downward, after which further downward movement of said plunger will maintain contact between said contact points and at the same time will move the valve 93 away from its seat, thereby admitting gas from the inlet chamber 88 to outlet chamber 91. The gas admitted to chamber 91 is conducted through pipe 92 to the combustion chamber and is discharged thereinto adjacent to the nozzle 49 through which mixed oil and air are admitted to said chamber. As shown in Fig. 8, the gas pipe 92 is also located within the air conduit 46 and preferably is supported by clips 108 from the pipe 43. The purpose of thus supplying illuminating gas to the combustion chamber is to facilitate ignition of the fuel mixture supplied by the pump B. The plunger 100 is moved downward for the purpose described by means of the breast portion 71 of the cam 70. As will be noted by reference to Fig. 1, soon after the shaft 69 begins to rotate such breast portion engages the upper end of the plunger 100 and forces it down to make contact between contact points 104, 105, which, as will be hereinafter explained, creates an ignition spark adjacent to the nozzle 49. At the same time gas is admitted to the combustion chamber and accordingly is ignited by such spark. The admission of gas and the sparking continue during the combustion starting movement of the shaft 69, but as the breast portion of said cam subtends an arc of somewhat less than one hundred and eighty degrees, shortly before said shaft completes its half rotation constituting the combustion starting movement, the breast portion of the cam rides off of the plunger 100 thereby permitting it to rise under the action of the spring 101, thereby breaking the circuit between the contact points 95 and 104. As the plunger 100 rises the valve 93 is seated by a spring 109 which bears against its lower end, as shown in Fig. 7, thus shutting off the supply of gas, which is then no longer necessary as by that time the fuel mixture will have been ignited. During the resetting movement of the shaft 69 the plunger 100 and valve 93 are not actuated, as the valley portion of the cam does not come into contact with the plunger 100 during that half cycle.

The necessary spark is created opposite the discharge point of the nozzle 49, when required, by means of two electrodes 110, 111 which are located within the duct 46 and are preferably supported by insulating clips 112 connected with the fuel pipe 43, as shown in Fig. 9. These electrodes have their free ends bent downward in proximity to the flange 51, so that when the requisite current is supplied high tension sparks are formed between said electrodes and said flange, thereby igniting the gas admitted through the gas pipe 92. The ignition of this gas in turn ignites the fuel mixture, so that when the gas supply is shut off combustion of the fuel mixture continues. The electrodes 110, 111 are connected, independently of each other, by wires 113, 114, respectively, with the secondary terminals of duplicate spark coils 115, so that while ordinarily sparks are formed by both electrodes, if either of them should fail the other would probably continue to function, thus insuring ignition except in case the spark coils themselves should fail to operate. The ends of the two spark coil secondaries which are not connected to the wires 113 and 114 are connected to ground indicated at 115'. I prefer to use spark coils, the primary of each of which is adapted to operate under a 110 volt current, and the electrical connections shown in Fig. 1 are so designed. It will be understood that when the contact point 104 is moved into engagement with contact point 95, 110 volt current is supplied to coils 115, but when said contact points are not in engagement with each other said coils are dead. The wiring arrangements will be hereinafter described.

To stop the main motor and cut off the supply of fuel should ignition fail to take place, or combustion accidentally cease while the main motor is operating, I provide a safety device one element of which is a switch controlled by the heat of the waste gases rising through the stack. This is shown diagrammatically in Fig. 1 and more in detail in Fig. 3, in which 116 indicates the stack and 117 a tube of brass or other good heat conducting material which is supported by and extends a short distance into the stack, as shown in Fig. 3. Preferably, this tube is fitted in a bushing 118 to which it is secured by a set screw 119, said bushing being fitted in a collar 120 secured to the side of the stack. A set screw 121 holds the bushing in said collar. The bushing 118 is also a good heat conductor, and secured to it and extending along the tube 117 is a thermostatic bar 122 adapted to be deflected away from the tube 117 by heat. Said bar extends into a box-like housing 123 and lies parallel with a vertically-swinging plate 124 pivoted at 125 to a suitable support 126. Said plate is provided with a lug 127 which extends over the outer end of the bar 122, as shown in Fig. 3, the parts being so arranged that when the bar 122 is deflected to an abnormal extent it will engage said lug and swing the plate 124 upwardly. A spring 128 connected with the bar 122 and with a fixed post 129 tends to return the bar 122 to its normal position as it cools off. The plate 124 carries a contact screw 130 which is insulated therefrom and is connected by a wire 131 with a binding post 132. The upper end of the screw 130 underlies the free end of the bar 122, which normally rests upon it and makes electrical contact with it, but when the bar 122 is deflected, due to the heat of the gases passing through the stack, it moves out of contact with said screw, thereby breaking the electrical connection between them. The extent to which the bar 122 may move away from the screw 130 is, however, limited by the lug 127, and when said bar engages said lug any further movement in the same direction of the bar 122 will rock the plate 124, carrying with it the screw 130, which nevertheless will still remain out of contact with the bar 122. When the bar 122 cools off sufficiently to cause its deflection in the opposite direction to an extent sufficient to again bring it into contact with the upper end of said screw a closed circuit between said members will be re-established at that time notwithstanding the fact that the plate 124 may then be considerably above its normal position. To facilitate this action a tension spring 133 is provided between the plate 124 and the support 126, around the pivot 125, so that its pressure will cause said parts to frictionally engage each other and prevent the plate 124 from swinging too freely on its pivot and necessitates plate 124 being pushed back by bar 122 engaging screw 130. The screw 130 may be readily adjusted to vary the range of independent movement of the bar 122, and the normal position of the plate 124 may be regulated by an adjusting screw 134 mounted in the support 126 in position to engage and serve as a stop for a lug 135 carried by said plate, as shown in Fig. 3. By adjusting the screw 134 the plate 124 may be adjusted so that its lug 127 will be out of contact with the plate 122 at any desired predetermined temperature.

Associated with the thermostatic switch above described is a thermostatically controlled circuit breaker, which is best shown in Figs. 1 and 13. This device comprises a suitable base plate 136 on which is pivotally mounted a vertically swinging bar 137 pivoted at 138 to said base plate, and connected by a link 139 with a lever 140, which is also pivoted on the base plate 136 by a pivot 141. The link 139 is connected with the lever 140 by a pivot 142, so that by rocking said lever the bar 137 may be swung up and down. The latter bar carries a contact point 143 that is insulated therefrom, and is connected by a wire 144 with one of the main line wires 145 through which current is supplied to the system from any suitable source. The contact point 143 is adapted to make contact with another contact point 146 carried by a stem 147 mounted to slide longitudinally through a bracket 148 rising from the base 136. A spring 149 presses upward on the contact point 146, but upward movement of said contact point is limited by a nut 150 screwed on the lower end of the stem 147. A spring 151 interposed between the bar 137 and a fixed stop 152 carried by the base plate normally thrusts upward on said bar.

The lever 140 is provided with two arms 153, 154 disposed substantially at right angles to each other and having flat opposing faces, between which faces is a stop pin 155 secured to the base 136, as shown in Fig. 13. The arrangement is such that when the circuit breaker is closed, that is, when the contact points 143, 146 are in contact with each other, the arm 153 bears against the stop pin 155, which limits the downward movement of the free end or handle portion of the lever 140. These parts are normally held in this position by a thermostatic latch bar 156, one end of which is adjustably secured in a bracket 157, pivotally mounted on the base 136 to swing laterally, by a pivot screw 158, while the other or free end thereof abuts against the plane face of the arm 154 adjacent to the base of said arm, as shown in said figure. The normal position of said latch bar may be adjusted by set screws 159, 160 mounted in lugs 161, 162 carried by the base and bearing against opposite sides of the bracket 157, so that by adjusting said screws the bracket may be swung laterally in either direction about its pivot. The latch bar 156 carries a heating coil 163, the circuit through which is controlled by the safety switch in the stack. These parts are designed to operate as follows: When the circuit through the coil 163 is closed by the stack switch, which is the case when the stack is not heated, current flowing through said coil will heat the latch bar 156 and cause its deflection upwardly from the position shown in Fig. 13. Its free end, therefore, will travel along the plane face of arm 154 of lever 140 until finally, if such deflection is carried far enough, it will pass off of the end of said arm, thereby releasing the lever 140, which will fly up under the action of the spring 151 pressing against the bar 137, breaking contact between contact points 143 and 146, thereby breaking the circuit through the main motor. It will be understood, however, that when the system is not in operation there is no current flowing through the coil 163, notwithstanding the fact that the circuit through it is closed, because current is supplied to said coil by means of an auxiliary circuit leading to a step down transformer 164, best shown in Fig. 1, which auxiliary circuit is not closed except when the system is in operation. The primary of the transformer 164 is designed to receive current at 110 volts and to step it down to 15 volts in the secondary circuit. As shown in Fig. 1, one end of the coil 163 is connected by a wire 165 with one of the secondary terminals 166 of said transformer, and the other secondary terminal 167 thereof is connected by a wire 168 with the contact point 132. The other end of the coil 163 is grounded by a wire 169 with the housing 123 of the stack switch, and through such housing is connected with the thermostatic bar 122. It will be evident from the foregoing description that when combustion is taking place in the furnace the thermostatic bar 122 of the stack switch will be heated, causing its deflection upwardly, thereby breaking contact between said bar and the contact screw 130 which is connected with the binding post 132, thereby breaking the secondary circuit through the coil 163. Accordingly the latch bar 156 will not be heated and will maintain its operative position shown in Fig. 13, whereby, through the lever 140, it holds the contact points 143, 146 in engagement with each other. Of course, it takes a little time after combustion starts before the thermostatic bar 122 is heated sufficiently to break the secondary circuit, so that at first the latch bar 156 will be heated to some extent and will travel upward along the arm 154 from its initial position, but the parts are so designed that, when combustion is taking place, before the latch bar 156 has moved upward far enough to clear the arm 154 the secondary circuit will have been broken in the manner described, whereupon the latch bar 156 cools and returns to its initial position, which it maintains as long as combustion is taking place. As will be hereinafter explained, when the system ceases to operate the supply of current to the primary of the transformer is cut off, so that then, although the stack switch closes, no current is supplied to the coil 163, and therefore the latch bar 156 is maintained in its operative position.

It will be noted that the thermostatic bar 122 of the stack switch is not subjected to the direct heat of the gases passing through the stack but is located outside of the stack and is heated by conducted heat. This is advantageous because the material of which such bars are composed soon deteriorates when subjected to high heat, and, therefore, by heating said bar by conducted heat this deterioration is avoided. By limiting the extent to which said bar may move away from the contact screw 130, no matter how much it may be deflected by the heat to which it is subjected, the operation of the instrument is made much more delicate and it responds much more quickly to variations in temperature. As a matter of fact, by providing a constant range of movement for said bar between its circuit closing and circuit breaking positions it will operate to close the secondary circuit at any time if the temperature should fall only a few degrees, whereas if the movement of said bar away from the contact screw 130 were unlimited it would require a long time after the heat in the stack failed for it to return to its circuit closing position.

The operation of the system is initially controlled by any suitable thermostat 170 located in one of the rooms of the house to be heated. Preferably I employ a thermostat of any approved commercial design operable by a current of 110 volts, but in Fig. 1 I have illustrated merely a conventional form of thermostat comprising a thermostatic bar 171 having a contact member 172 located between contact points 173 and 174, so that when the temperature falls to a predetermined point, movement of the bar 171 to the left as viewed in Fig. 1 will make electrical contact between contact points 172, 173, and when the temperature rises to a predetermined point movement of the bar 171 to the right will make contact between the contact points 172 and 174. The electrical connections are such that when contact point 172 moves into engagement with contact point 173 the heating system is started and continues to operate until the rising temperature in the house causes the thermostat 170 to move contact point 172 into engagement with contact point 174, thereby stopping the operation of the system, and this cycle of operations is repeated automatically, so that the house is constantly maintained at a uniform temperature.

The electrical connections by which the operation of the several parts of the apparatus is accomplished are as follows: As has been explained, the system is designed to be operated by current supplied from a central station either at 110 volts or 220 volts, and 145 indicates one of the main line wires through which such current is supplied, the other line wire being indicated by 175, see Fig. 1. These line wires lead to a fuse box 176, shown in Fig. 13, in which are fuses 177, 178. As has been explained, one of the line wires, as 145, is connected by wire 144 with contact point 143, and as shown in Fig. 1 the opposing contact point 146 is connected by a wire 179 with one of the terminals of the auxiliary motor E. A branch 180 from said wire connects with the segment 75 of the main motor switch. The other line wire 175 is connected by a wire 181 with one of the terminals 182 of the main motor A, and by a branch wire 183 with the other main terminal of the auxiliary motor E. Referring to Figure 1a, within the structure of the auxiliary motor E, the two conductors 179 and 183 are connected to the field coils e and to the contact plate 84, the conductor 179 being shown as connected to one end of said field coils and the other conductor 183 being shown as connected to contact plate 84. The other end of the field coils e are grounded to the motor frame, and it will therefore be evident that whenever a ground is established for the contact plate 84, as through the grounded contact finger 82 and through the connections leading to the room thermostat 170, the auxiliary motor E will operate. This motor may be of any desired type, such as an induction motor having shaded poles for self-starting. If it is desirable to have the room thermostat 170 only handle a comparatively low voltage the herein described controls may be arranged as disclosed in the patent to Paul F. Shivers No. 1,664,325. One auxiliary electric motor switch which I have employed in my system is known commercially as the Honeywell. The other terminal 184 of the main motor is connected by a wire 185 with segment 76. Thus when the main motor controlling switch is closed a line wire circuit is established through the main motor which includes the circuit breaker switch controlled by the thermostatic stack switch. Contacts 95 and 104 which control the ignition circuit are connected across the main line wires as follows: A wire 186 connected to binding post 106 and to wire 181 connects contact 104 with one side of the main circuit, and a wire 187 connected to binding post 97 and to one of the primary terminals of each of the coils 115 connects contact 95 with said coils. A wire 188 connects the other primary terminals of said coils with wire 185, which, when the main motor switch is closed, is connected with wire 180 and through it with the other side of the line wire circuit. Wire 185 is also connected by a wire 189 with a binding post 190 on the switch panel, which binding post is connected by a wire 191 with one of the primary terminals of the transformer 164. The other primary terminal of said transformer is connected by a wire 192 with a binding post 193 on the panel, which in turn is connected by a wire 194 with contact point 106 on the ignition switch frame. Consequently current is supplied to the primary of the transformer when the main motor switch is closed, and it follows, of course, that current can be supplied to the coil 163 of the circuit breaker only at that time.

As has been explained, the auxiliary motor E is provided with three contact plates 83, 84, 85, and as shown in Figures 1 and 1a these are connected, respectively, to binding posts 195, 196, 197. The binding post 195 is connected by a wire 198 with contact point 173 of the house thermostat 170, and also by wire 199 with binding post 66 which connects with spring contact 65 of the centrifugal switch C. Thus when the main motor is not in operation the contact point 173 of the house thermostat besides being connected to contact plate 83 of the auxiliary motor E is grounded through the centrifugal switch. Binding post 196 of the auxiliary motor is connected by a wire 200 to contact point 172 of the house thermostat, and binding post 197 of the auxiliary motor is connected by a wire 201 with contact point 174 of the house thermostat. The binding post 197 is also connected by a wire 202 to a spring contact 203 mounted on and insulated from the frame of the ignition switch F and positioned so that normally it is out of contact with cam 70, but as soon as said cam starts to rotate from its normal position said spring contact will be engaged by the breast of said cam and will continue in engagement therewith during the greater part of the half cycle which constitutes the main motor starting movement of the auxiliary motor, so that during that interval contact point 174 is grounded to the auxiliary motor frame. Shortly before the completion of such half cycle the breast of the cam 70 moves out of contact with said contact member 203.

The spring contact member 82 cooperates with contact plates 83, 84, 85 to control the operating circuit through the auxiliary motor E. Before the house thermostate operates to start the heating system the spring contact 82 bears on contact plate 83 which is then disconnected from contact plate 84 because the circuit is broken through the house thermostate. As previously described, contact plate 84 is connected with conductor 183 of the auxiliary motor operating circuit, and said motor is started by making a grounding connection with said contact plate, which, in the operation of the system, is accomplished as follows: When the parts are in the position shown in Figures 1 and 1a, at which time the house would be above the critical temperature and contact point 172 of the house thermostat would not be in engagement with contact point 173, but would be in engagement with contact 174, there is no circuit through the auxiliary motor E since finger 82 which provides a grounding connection for contact plate 84, then bears on contact plate 83, which is not then connected with plate 84. Cam 70, which is always in electrical connection with finger 82, is then out of contact with spring 203, so that the ground connection from contact point 174 is then broken. Assume now that the temperature of the room has fallen sufficiently to cause the thermostat 170 to move contact 172 into engagement with contact 173, thereby electrically connecting contact plates 83 and 84 through said thermostat. A ground connection is thereby formed from contact plate 84, through plate 83, wire 199 and the centrifugal switch C, since, the main motor being idle at that time, said switch is in its circuit closing position. The auxiliary motor E thereupon starts, the finger 82 moves toward contact plate 84, and the cam 70 on slowly moving shaft 69 moves into engagement with contact spring 203, thereby grounding contact point 174, as cam 70 is grounded through shaft 69 to the frame of the auxiliary motor. Shortly after auxiliary motor E starts, preferably in about five seconds, the switch controlling the main motor circuit is closed by the rotation of the shaft 69, and accordingly the main motor starts. The starting of the main motor gradually starts rotation of centrifugal switch C, and when the latter attains some speed, it opens, because of the outward movement of shoes 63, breaking the ground connection through said switch, but this does not occur until after the cam 70 has made contact with contact spring 203, as owing to the friction drive for said centrifugal switch the auxiliary motor gets well under way before said centrifugal switch operates to break the ground connection at that point. Notwithstanding the breaking of the latter ground connection the auxiliary motor continues to operate because its operating circuit is also grounded through finger 82. As long as finger 82 is on contact plate 83 contact plate 84 is connected to said finger through the contact points 172, 173 of the house thermostat, provided said thermostat has not operated to open the circuit between said contact points. If, however, the house thermostat should operate to reverse the circuit before finger 82 moves into engagement with contact point 85, the circuit through the auxiliary motor will nevertheless remain closed until the half cycle is completed because then, even though finger 82 be still in engagement with contact plate 83, contact plate 84 will have a ground connection through wire 200, contact points 172, 174, which will have been connected by the reversing action of the thermostat, wires 201, 202, spring 203, cam 70 and shaft 69, which is grounded. If, on the other hand, the house thermostat contact 172 should at this time momentarily move to an intermediate position out of engagement with both contacts 173 and 174, the auxiliary motor will continue to operate through the ground connection established by the engagement of the finger 82 with the contact point 84. It will be seen, therefore, that, no matter what the house thermostat may do after the auxiliary motor starts, said motor will continue to operate until the half cycle representing the starting movement of the heating system has been completed, which is preferably timed to occur in about twenty-three seconds. This provision for the completion of the half cycle is very important because it insures proper operation of the apparatus at all times. When such half cycle has been completed the finger 82 will have been moved into engagement with contact plate 85 and cam 70 will have moved out of engagement with contact spring 203. If when this occurs contact 172 is still in engagement with the contact 173,—which would normally be the case, as ordinarily considerable time would be required to heat the house up to a temperature where the thermostat would separate said contacts,—the auxiliary motor will stop, because the ground connection of contact plate 84 would be broken as soon as finger 82 moves out of engagement with said contact plate. At this time there is no ground connection through the centrifugal switch C because the main motor is then in operation supplying fuel to the combustion chamber and accordingly said switch is open. When the warmth of the house causes the thermostat to reverse its connections, movement of contact 172 into engagement with contact 174 connects contact plate 84 with contact plate 85 and through it with the grounding finger 82, which then bears on said plate 85. This starts the auxiliary motor for its resetting half cycle, which ends when the finger 82 moves out of engagement with contact plate 84, and into engagement with contact plate 83. When this occurs the auxiliary motor stops, as during the resetting half cycle the cam 70 does not engage the spring contact 203, and when finger 82 leaves contact plate 84 the latter no longer has a grounding connection. As has been explained, during the second half cycle of the operation of the auxiliary motor the main motor switch is opened and said motor stops, and thus all the parts are reset to their initial positions, ready to repeat the cycle as the house temperature may require. During the first half cycle the rotation of the cam 70 will cause its breast 71 to depress the plunger 100, thereby closing the ignition circuit through contacts 104 and 95, which will cause sparks to be generated at the discharge point of the fuel into the combustion chamber. Very shortly thereafter the gas valve will be opened admitting gas to the combustion chamber, which will be ignited by the sparks and in turn will ignite the fuel mixture supplied by the operation of the main motor, as has already been described. During the resetting half cycle, the ignition circuit is not closed, and the gas valve is not opened, as during that movement of the cam 70 it does not engage the plunger 100. Obviously, ignition and gas are not required at that time.

From the foregoing description it will be seen that the proper operation of the apparatus is insured even under unusual conditions. For example, if the house is sufficiently heated and an outside door leading to the room where the house thermostat is located should be opened long enough to cool off that room sufficiently to actuate the thermostat, the auxiliary motor would of course start up, starting the main motor in the manner above described, but even though the immediate closing of the door should cause the thermostat to operate in the reverse direction before the first half cycle is completed, the auxiliary motor would nevertheless continue to run until the completion of such half cycle, immediately after which it would continue with the resetting half cycle, stopping the main motor. Again, if the source of electric power should fail, as not infrequently occurs during thunder storms, or for other reasons, obviously the main motor would stop if it happened to be in operation at such a time. In such circumstances, since the main motor operates only when the house is not warm enough, contact 172 would be in engagement with contact 173, and finger 82 would be on contact plate 85. The main motor switch would, of course, be closed at this time, and consequently as soon as the power supply was restored the main motor would start. To allow the main motor to continue to operate for any length of time in such an event would be objectionable because there would be no ignition, but this would be prevented because upon the restoration of power the auxiliary motor would start on the resetting half cycle of its operation by reason of the ground connection through the centrifugal switch C established by the stopping of the main motor, and before the opening of said switch by centrifugal action, finger 82 would be moved, by the action of cam 77, into engagement with contact plate 84. The resetting operation would therefore continue until finger 82 passed into engagement with contact plate 83, when the auxiliary motor would stop. By this resetting half cycle the parts would be reset to their regular starting position, including the stoppage of the main motor by the opening of its controlling switch, and then, if the house should be too cool, the system would again be automatically started up in the regular way. Therefore, the danger that the main motor might operate for any considerable length of time without combustion taking place is avoided. The safety thermostatic switch in the stack, previously described, also serves to prevent this, and besides, by breaking the main line circuit, it prevents the useless repetition of the above described cycle of operations, should the ignition devices repeatedly fail to function.

It will be seen that my improved apparatus is entirely automatic and realizes the desirable features hereinbefore pointed out. Besides it has various additional advantages over other constructions. It will be noted that the circuit breaker controlled by the thermostatic switch at the stack controls the line circuit through the main motor as well as the circuit through the auxiliary motor, thereby cutting off all current from the system should the ignition devices fail to function, which is more desirable than to control the operation of the main motor merely by controlling the low voltage current supplied to an auxiliary motor, as in some prior constructions. Another desirable feature is that the transformer which supplies current to the thermostatic switch at the stack receives current only when the main motor switch is closed and said motor is in operation. Such small transformers are not ordinarily reliable when the current flows continuously through them, but are apt to break down under such service, and danger of this is avoided by the arrangement described since the transformer receives current only at intervals, and then only so long as the main motor is operating. As has been suggested, the spark is created shortly before the gas valve is opened, and this is desirable because it insures the immediate ignition of the gas, thereby avoiding accumulation in the combustion chamber of any considerable volume of unignited gas which might cause an explosion. The igniting devices described are very efficient, and by providing the two coils obviously if one of the coils should break down or one of the sparking devices fail to operate the other will insure ignition. In this connection I wish it to be understood that while I prefer to make use of artificial or other combustible gas to facilitate ignition, my invention contemplates also direct ignition of the fuel mixture without the intervention of such gas. By taking the liquid fuel from a sump, as described, obviously when the system is not in operation no oil is being withdrawn from the sump, and it is unnecessary to provide valves or make other provision for stopping the supply of oil at that time, which not only would increase the number of parts in the apparatus, making it more expensive and complicated, but besides the operation of mechanically operated shut-off devices is not dependable.

So far as I am aware I am the first in the art to provide a liquid fuel burning system constructed and operating in the manner described, and I wish it to be understood, therefore, that my invention is to a large extent generic in character, and that the claims hereinafter made are not intended to be limited to the specific embodiment of my invention illustrated and described, but are designed to include such modifications or variations thereof as would occur to those skilled in the art. I do not claim as of my invention a circuit breaker, separately considered, comprising a thermostatic element, such as the bar 156, which operates as a latch to normally hold certain parts of the circuit breaker in a predetermined relation to each other, but my invention includes the incorporation in a liquid fuel burning system of such a circuit breaker generically, as well as the particular circuit breaker shown and described, and its control in the manner hereinbefore pointed out.

What I claim as my invention and desire to secure by Letters Patent, is—

1. In a liquid fuel burning system, the combination with a main motor, means actuated thereby for supplying fuel to a combustion chamber, electric ignition devices, a power circuit for supplying current to said main motor, an auxiliary motor controlling the operation of said ignition means, a switch controlled by said auxiliary motor for controlling the main motor operating circuit, and thermostatic means for controlling the operation of said auxiliary motor, of a circuit breaker in the power circuit, said circuit breaker comprising contact members, means for moving said members into engagement with each other, a spring tending to separate said members, and a thermostatic element adapted to hold said contact members in engagement with each other against the tension of said spring and operable to release said contact members to permit the separation thereof, and thermostatic means heated by the combustion of the fuel for controlling the operation of said thermostatic element.

2. In a liquid fuel burning system, the combination with a motor, means actuated thereby for supplying fuel to a combustion chamber, ignition devices, a power circuit for supplying current to said motor, a switch for controlling the motor operating circuit, and thermostatically controlled means for opening and closing said switch, of a circuit breaker in the power circuit, said circuit breaker comprising contact members, means for moving said members into engagement with each other, a spring tending to separate said members, and a thermostatic element adapted to hold said contact members in engagement with each other against the tension of said spring and operable to release said contact members to permit the separation thereof, said thermostatic element being movable to a limited extent without releasing said contact members, and thermostatic means heated by the combustion of the fuel for controlling the operation of said thermostatic element.

3. In a liquid fuel burning system, the combination with a motor, means actuated thereby for supplying fuel to a combustion chamber, ignition devices, a power circuit for supplying current to said motor, a switch for controlling the motor operating circuit, and thermostatically controlled means for opening and closing said switch, of a circuit breaker in the power circuit, said circuit breaker comprising contact members, a lever operable to move said contact members into engagement with each other, said lever having an angularly-disposed arm, a spring tending to separate said contact members, and a thermostatic bar adapted to engage said arm to hold said contact members in engagement with each other, said bar being movable along said arm, and a thermostatic switch, heated by the combustion of the fuel, controlling the operation of the thermostatic bar.

4. In a liquid fuel burning system, the combination with a main motor, means actuated thereby for supplying fuel to a combustion chamber, a switch for controlling the operation of said motor, and means for igniting the fuel, of an auxiliary motor, a slow motion shaft intermittently rotated by said auxiliary motor through successive cyclical movements, means carried by said shaft for successively opening and closing said switch during alternate cyclical movements of said shaft, a thermostat, means controlled by said thermostat for starting the cyclical movements of said auxiliary motor, means controlled by the rotation of said shaft for stopping said auxiliary motor at the conclusion of each of its cyclical movements, a centrifugal switch operable by said main motor, serving in cooperation with said thermostat to establish an operating circuit through said auxiliary motor when the main motor is not in operation and arranged to be moved to an inoperative position by the operation of said main motor, and means for maintaining an operating circuit through said auxiliary motor after it starts and until its cyclical movement is completed.

5. In a liquid fuel burning system, the combination with a main motor, means actuated thereby for supplying fuel to a combustion chamber, a switch for controlling the operation of said motor, and means for igniting the fuel, of an auxiliary motor, a slow motion shaft intermittently rotated by said auxiliary motor through successive cyclical movements, means carried by said shaft for successively opening and closing said switch during alternate cyclical movements of said shaft, a thermostat, means controlled by said thermostat for starting the cyclical movements of said auxiliary motor, means controlled by the rotation of said shaft for stopping said auxiliary motor at the conclusion of each of its cyclical movements, a centrifugal switch operable by said main motor, serving in cooperation with said thermostat to establish an operating circuit through said auxiliary motor when the main motor is not in operation and arranged to be moved to an inoperative position by the operation of said main motor, friction clutch mechanism for driving said centrifugal switch by said main motor, and means for maintaining an operating circuit through said auxiliary motor after it starts and until its cyclical movement is completed.

6. An ignition device for liquid fuel burning systems comprising an endwise movable plunger, a gas valve adapted to be opened by endwise movement of said plunger in one direction, contact members carried by said plunger and valve and movable into engagement with each other when said plunger is actuated to open said valve, devices for normally holding said valve closed and separating said contact members, a gas pipe the discharge of which is controlled by said valve, spark forming means adjacent to the discharge point of said gas pipe, and connections whereby movement of said contact members into engagement with each other will cause a sparking at the discharge point of said gas pipe.

7. An ignition device for liquid fuel burning systems comprising an endwise movable plunger, a gas valve adapted to be opened by endwise movement of said plunger in one direction, contact members carried by said plunger and valve and movable into engagement with each other when said plunger is actuated to open said valve, devices for normally holding said valve closed and separating said contact members, a gas pipe the discharge of which is controlled by said valve, spark forming means adjacent to the discharge point of said gas pipe, connections whereby movement of said contact members into engagement with each other will cause a sparking at the discharge point of said gas pipe, a cam for moving said plunger to open said valve, a shaft on which said cam is mounted, and a thermostatically controlled motor for rotating said shaft.

8. In a liquid fuel burning system, the combination with a motor, means actuated thereby for supplying fuel to a combustion chamber, electric ignition devices, and a power circuit for supplying current to said main motor, of a circuit breaker in the power circuit, said circuit breaker comprising contact members, means for moving said members into engagement with each other, a spring tending to separate said members, a thermostatic element adapted to hold said contact members in engagement with each other against the tension of said spring and operable to release said contact members to permit the separation thereof, and thermostatic means heated by the combustion of the fuel for controlling the operation of said thermostatic element.

9. A liquid fuel burning system comprising an electric motor, means actuated thereby for supplying fuel to a combustion chamber, a high voltage circuit for said motor, a switch in said high voltage circuit for controlling the operation of said motor, a room thermostat in said high voltage circuit, electrical means responsive to said thermostat for opening and closing said switch, a circuit breaker in said high voltage circuit, a thermostatic switch operable by the heat generated by the combustion of the fuel, a low voltage circuit connected with said thermostatic switch, means responsive to said low voltage circuit and operatively connected with said circuit breaker whereby said circuit breaker is caused to open should ignition fail or combustion cease, and a transformer having its primary winding connected to the high voltage circuit and its secondary winding connected to said low voltage circuit, said primary winding being connected to said high voltage circuit whereby the operation of said circuit breaker interrupts the operation of said motor and also interrupts the flow of current in said primary winding.

10. A liquid fuel burning system comprising a main motor, means actuated thereby for supplying fuel to a combustion chamber, a high voltage circuit for said motor, a motor control switch in said high voltage circuit, an auxiliary motor in said high voltage circuit comprising a shaft having uni-directional rotative movement, said motor control switch being operatively connected with said shaft for actuation thereby, a room thermostat, means cooperating with said room thermostat for connecting and disconnecting said auxiliary motor and said high voltage circuit, a circuit breaker in said high voltage circuit on the line side of both of said motors, adapted in its opening to disconnect both motors from the high voltage line, a thermostatic switch operable by the heat generated by the combustion of the fuel, a low voltage circuit connected with said thermostatic switch, electrical means responsive to said low voltage circuit and operatively connected with said circuit breaker whereby said circuit breaker is caused to open should ignition fail or combustion cease, and a transformer having its primary winding connected to said high voltage circuit and its secondary winding connected to said low voltage circuit.

11. A liquid fuel burning system comprising a main motor, means actuated thereby for supplying fuel to a combustion chamber, a high voltage circuit for said motor, a motor control switch in said high voltage circuit, temperature responsive means in said high voltage circuit for opening and closing said switch, a circuit breaker in said high voltage circuit for interrupting the operation of said main motor, said circuit breaker comprising contact members normally tending to separate, a thermostatic element adapted to hold said contact members in engagement with each other and operable when heated to release said members to permit the separation thereof, thermostatic switch means adapted to be opened by the heat of combustion of the fuel, and a low voltage circuit deriving its electrical energy from said high voltage circuit and operatively connected with said thermostatic switch means and effective to heat said thermostatic element when said thermostatic switch means remains closed, whereby said circuit breaker is caused to open should ignition fail or combustion cease.

12. A liquid fuel burning system comprising a main motor, means actuated thereby for supplying fuel to a combustion chamber, a high voltage circuit for said motor, a motor control switch in said high voltage circuit, an auxiliary motor comprising a shaft having uni-directional rotating movement, said motor control switch being operatively connected to said shaft for actuation thereby, an oscillatory selector switch actuated by said shaft, a three-terminal room thermostat included in said high voltage circuit, circuit connections between the three terminals of said thermostat and said selector switch, means for connecting said auxiliary motor to said high voltage circuit through said selector switch and room thermostat, a circuit breaker in said high voltage circuit, said circuit breaker comprising a thermostatic element for opening the same, a thermostatic switch operable by the heat generated by the combustion of the fuel, a low voltage circuit connecting said thermostatic element with said thermostatic switch, and a transformer having its primary winding connected to said high voltage circuit on the motor side of said circuit breaker and having its secondary winding connected to said low voltage circuit.

MARSHALL H. BRADEN.